L. H. OBERREICH.
SHOCK ABSORBER.
APPLICATION FILED MAY 31, 1919.
1,361,479.
Patented Dec. 7, 1920.
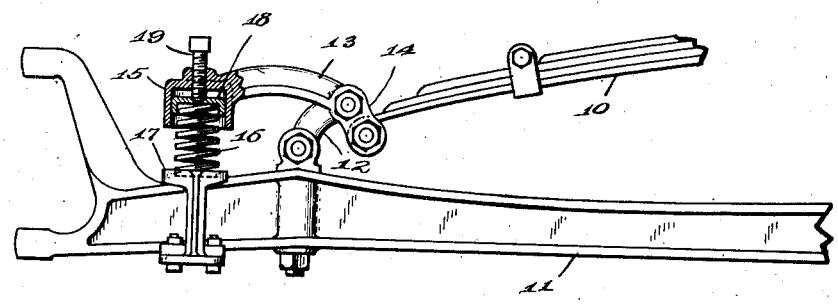
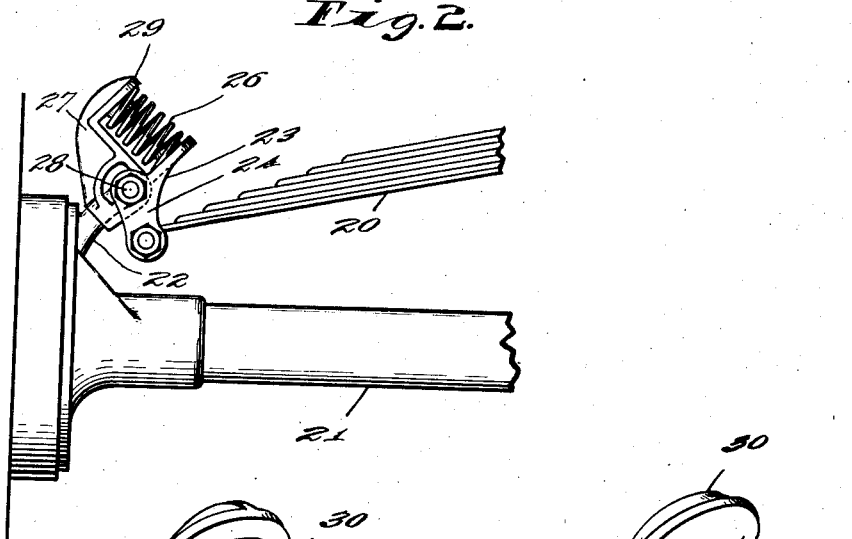
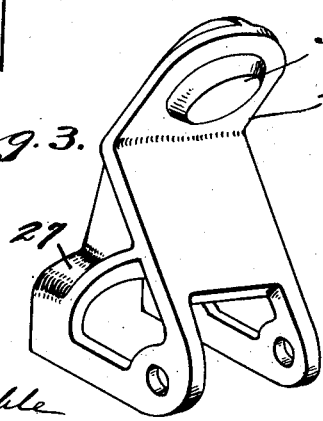
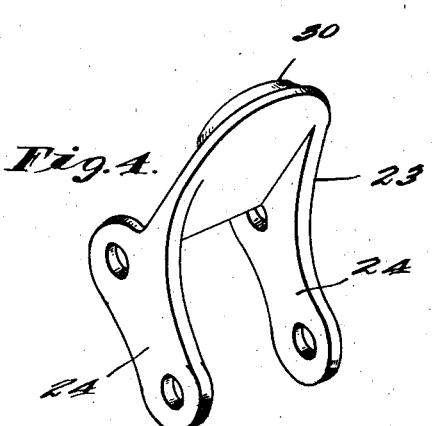
Witness
Frank A. Sable
Inventor
Louie H. Oberreich,
By
Hood & Ashley.
Attorneys

UNITED STATES PATENT OFFICE.

LOUIE H. OBERREICH, OF INDIANAPOLIS, INDIANA.

SHOCK-ABSORBER.

1,361,479.

Specification of Letters Patent.   Patented Dec. 7, 1920.

Application filed May 31, 1919. Serial No. 300,796.

*To all whom it may concern:*

Be it known that I, LOUIE H. OBERREICH, a citizen of the United States, residing at Indianapolis, in the county of Marion and State of Indiana, have invented a new and useful Shock-Absorber, of which the following is a specification.

It is the object of my invention to provide a simple form of shock absorber, which can be applied to Ford cars without requiring any material change in the spring and axle structure thereof but is simply substituted for the ordinary supporting shackle at the spring end, and which is particularly adapted to take the rebound shocks.

The accompanying drawing illustrates my invention. Figure 1 is a fragmentary elevation of a front axle and spring equipped with a shock absorber of my invention; Fig. 2 is a similar view of a rear axle and spring equipped with such a shock absorber; and Figs. 3 and 4 are perspective views of parts of the shock absorber for the rear axle.

Referring first to the front-axle structure shown in Fig. 1, the main spring 10 and the front axle 11 are of standard Ford construction, and the axle has the standard perch 12 from which the end of the spring 10 is supported. The perch 12 projects upward and inward from the axle. The end of the spring 10 and the end of the perch are both provided with eyes. None of this need be at all changed from standard. In the standard construction, however, the eyes of the perch and the main spring are connected by a shackle or link. I remove that shackle or link, and in place of it provide a lever 13 which has a link portion 14 substantially corresponding to the standard shackle or link and pivotally connected to both such eyes. Thus by reason of this portion 14 of the lever 13, the spring 10 is suspended from the perch 12 in substantially the same way as in the standard construction. In addition, the lever 13 has a projecting arm, which at its end is provided with a cup 15 in which is seated the upper end of a compression spring 16, the lower end of which bears against a spring seat 17 suitably mounted on the axle 11 between the perch 12 and the end of the axle. The spring 16 is preferably adjustable, as by a plate 18 which bears against its upper end within the cup 15 and is adjustable by a screw 19.

In operation, when the spring 10 is pushed down, it spreads as in the standard construction, and turns the lever 13 in the direction to relieve the pressure on the spring 16. On the rebound, however, the lever 13 must turn in the opposite direction, and this movement is opposed by the spring 16, which thus takes the rebound and reduces its effect on the car body.

The rear-axle structure is in principle the same as the front-axle structure. Here the same as the front axle structure. Here the rear spring 20, the rear axle 21, and the rear perch 22 are standard. In place of the ordinary shackle connecting eyes at the end of the spring 20 and the perch 22, I provide a lever 23, (shown in detail in Fig. 4,) which has a portion 24 which corresponds in function to the standard shackle or link; and this lever 23 has a projecting arm for coöperating with a rebound-taking spring 26. However, as the perch 22 springs from the enlargement provided for the brake structure at the end of the rear axle 21, it is impossible to locate the spring 26 so that its upper end bears against the axle. Therefore, in order to provide a suitable abutment for such spring, I mount on the perch 22 a saddle 27, (shown in detail in Fig. 3,) which bears against the outer face of the perch between its eye and its base and is attached to the perch eye by the pivot bolt 28 by which the lever 23 is attached to such eye. This saddle 27 has a finger 29 which abuts against one end of the spring 26, so that such spring is located between such finger 29 and the lever 23, both of which are shown as having bosses 30 projecting into the ends of the spring 26 to prevent displacement of the spring. The projecting arm of the lever 23 and the finger 29 of the saddle 27 are located above the perch 22, in order to clear the other parts, and such projecting arm projects partly over the main spring 20; but this is merely for the purpose of non-interference with other parts.

In operation, the rear-axle shock absorber is substantially identical with the front-axle shock absorber. When the spring 20 is depressed, the lever 23 is turned in the direction to relieve the compression of the spring 26. Upon rebound, however, the lever 23 is turned in the opposite direction; and this turning is resisted by the spring 26, which thus takes the rebound.

In both forms of the shock absorber, the main body spring may be depressed without interference from the shock-absorber spring; but upon rebound the shock-absorber spring resists the movement of the lever connecting the two springs, and so lessens the effect of the rebound on the vehicle body.

I claim as my invention:

1. In combination with the main spring, axle, and perch of an automobile; a lever having a link portion directly pivotally connected to the perch and to the main spring, and a projecting arm portion; and a spring acting on the projecting arm portion of said lever in the direction to oppose the turning thereof which is produced by the separation of the main spring and axle upon rebound, said lever being free from spring opposition in its turning in the opposite direction.

2. In combination with the main spring, axle, and perch of an automobile; a lever having a link portion directly pivotally connected to the perch and to the main spring, and a projecting arm portion; and a spring acting between said projecting arm portion of said lever and the axle in the direction to resiliently oppose the turning of said lever which occurs when the spring and axle separate upon rebound.

3. In combination with the main spring, axle, and perch of an automobile; a lever having a link portion directly pivotally connected to the perch and to the main spring, and a projecting arm portion; and a compression spring acting between said projecting arm portion of said lever and the axle in the direction to resiliently oppose the turning of said lever which occurs when the spring and axle separate upon rebound.

4. In combination with the body spring, axle, and a perch carried by the axle and projecting upward and inward therefrom, a link projecting downward and inward from the free end of the perch and connecting said free end to the end of said body spring, said link having a projecting arm, and a spring acting between said arm and the axle and opposing the movement of the link which occurs when the spring and axle separate upon rebound.

5. In combination with the main spring, axle, and perch of an automobile, a lever having a link portion directly pivotally connected to the perch and to the main spring and a projecting arm portion, and a separate spring acting on the projecting arm portion of said lever in the direction to oppose the turning thereof which is produced by the separation of the main spring and axle upon rebound.

6. In combination with the main spring, axle, and perch of an automobile, a link directly connecting the end of the main spring and the end of the perch and by which the main spring is suspended from the perch, and a supplemental spring acting on said link only in opposition to the movement thereof which occurs when the main spring and axle separate upon rebound.

7. In combination with the main spring, axle, and perch of an automobile, a lever having a link portion directly pivotally connected to the perch and to the main separate spring and a projecting arm portion, and a spring acting on the projecting arm portion of said lever in the direction to oppose the turning thereof which is produced by the separation of the main spring and axle upon rebound.

8. In combination with the main spring, axle, and perch of an automobile, a link directly connecting the end of the main spring and the end of the perch and by which the main spring is suspended from the perch, and means supported from the axle for limiting that movement of the link which occurs when the main spring and axle separate upon rebound.

9. In combination with the body spring, axle, and perch carried by the axle, a link pivotally mounted upon said perch and projecting downward and inward from its point of pivotal support thereon and pivotally connected to the end of the body spring, said link having a projecting arm, and a spring acting between said arm and the axle and opposing the movement of the link which occurs when the spring and axle separate upon rebound.

10. In combination with the body spring, axle, and perch carried by the axle, a link pivotally mounted upon said perch and projecting downward from its point of pivotal support thereon and pivotally connected to the end of the body spring, said link having a projecting arm, and a spring acting between said arm and the axle and opposing the movement of the link which occurs when the spring and axle separate upon rebound.

11. In combination with the body spring, axle, and perch of an automobile, a pair of relatively pivotally-associated jaws mounted on the perch, one of said jaws having a depending portion directly pivotally connected to the body spring, and a separate spring interposed between the jaws to resist movement of the main spring away from the axle only.

12. In combination with the body spring, axle, and perch of an automobile, a pair of relatively pivotally-associated jaws mounted on the perch, one of said jaws having a portion directly pivotally connected to the body spring, and a separate spring interposed between the jaws to resist movement of the main spring away from the axle only.

13. In combination with the body spring, axle, and perch of an automobile, a pair of relatively pivotally-associated jaws mounted on the perch, one of said jaws having a depending portion directly pivotally connected to the body spring, and a separate spring interposed between the jaws to resist movement of the main spring away from the axle.

14. In combination with the body spring, axle, and perch of an automobile, a pair of relatively pivotally-associated jaws mounted on the perch, one of said jaws having a portion directly pivotally connected to the body spring, and a separate spring interposed between the jaws to resist movement of the main spring away from the axle.

15. In combination with the body spring, axle, and perch of an automobile, a pair of jaws mounted on the perch by a single pin which serves as a pivotal support for one jaw, a depending portion carried by the pivotal jaw and directly pivoted to the spring, and a separate spring interposed between the jaws to resist movement of the main spring away from the axle only.

16. In combination with the body spring, axle, and perch of an automobile, a pair of jaws mounted on the perch by a single pin which serves as a pivotal support for one jaw, a portion carried by the pivotal jaw and directly pivoted to the spring, and a separate spring interposed between the jaws to resist movement of the main spring away from the axle only.

17. In combination with the body spring, axle, and perch of an automobile, a pair of jaws mounted on the perch by a single pin which serves as a pivotal support for one jaw, a depending portion carried by the pivotal jaw and directly pivoted to the spring, and a separate spring interposed between the jaws to resist movement of the main spring away from the axle.

18. In combination with the body spring, axle, and perch of an automobile, a pair of jaws mounted on the perch by a single pin which serves as a pivotal support for one jaw, a portion carried by the pivotal jaw and directly pivoted to the spring, and a separate spring interposed between the jaws to resist movement of the main spring away from the axle.

In witness whereof I have hereunto set my hand at Indianapolis, Indiana, this 27th day of May, A. D. one thousand nine hundred and nineteen.

LOUIE H. OBERREICH.